(12) United States Patent
Klasing et al.

(10) Patent No.: US 8,500,396 B2
(45) Date of Patent: Aug. 6, 2013

(54) CASCADE TIP BAFFLE AIRFOIL

(75) Inventors: Kevin Samuel Klasing, Springboro, OH (US); Ching-Pang Lee, Cincinnati, OH (US); Paul Hadley Vitt, Hamilton, OH (US); Brian David Keith, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 1863 days.

(21) Appl. No.: 11/507,120

(22) Filed: Aug. 21, 2006

(65) Prior Publication Data

US 2009/0324422 A1    Dec. 31, 2009

(51) Int. Cl.
*F01D 5/20*    (2006.01)

(52) U.S. Cl.
USPC ....................... 415/173.1; 416/228

(58) Field of Classification Search
USPC ................. 415/173.1, 173.4, 174.4; 416/228
See application file for complete search history.

(56) References Cited

U.S. PATENT DOCUMENTS

| | | | |
|---|---|---|---|
| 3,635,585 A | 1/1972 | Metzler | |
| 3,781,129 A | 12/1973 | Aspinwall | |
| 4,010,531 A | 3/1977 | Andersen et al. | |
| 4,142,824 A | 3/1979 | Anderson | |
| 4,390,320 A | 6/1983 | Eisworth | |
| 4,424,001 A | 1/1984 | North et al. | |
| 4,606,701 A | 8/1986 | McClay et al. | |
| 4,682,933 A * | 7/1987 | Wagner | 415/173.5 |
| 4,893,987 A | 1/1990 | Lee et al. | |
| 4,940,388 A | 7/1990 | Lilleker et al. | |
| 4,992,025 A | 2/1991 | Stroud et al. | |
| 5,261,789 A | 11/1993 | Butts et al. | |
| 5,282,721 A | 2/1994 | Kildea | |
| 5,476,364 A | 12/1995 | Kildea | |
| 5,503,527 A | 4/1996 | Lee et al. | |
| 5,564,902 A | 10/1996 | Tomita | |
| 5,660,523 A | 8/1997 | Lee | |
| 5,720,431 A | 2/1998 | Sellers et al. | |
| 5,738,491 A * | 4/1998 | Lee et al. | 415/177 |
| 5,997,251 A * | 12/1999 | Lee | 416/97 R |
| 6,027,306 A * | 2/2000 | Bunker | 415/173.5 |

(Continued)

FOREIGN PATENT DOCUMENTS

| | | |
|---|---|---|
| DE | 19963375 A1 | 7/2001 |
| EP | 1748153 A1 | 1/2007 |

(Continued)

OTHER PUBLICATIONS

Mischo, B., "Flow Physics and Profiling of Recessed Blade Tips: Impact on Performance and Heat Load," ASME GT2006-91074, May 8-11, 2006, pp. 1-11.

(Continued)

*Primary Examiner* — Nathaniel Wiehe
(74) *Attorney, Agent, or Firm* — General Electric Company; David J. Clement; Sushupta T. Sudarshan

(57) ABSTRACT

A turbine blade includes an airfoil tip with first and second ribs extending along the opposite pressure and suction sides. The ribs extend outwardly from a tip floor and are joined together at opposite leading and trailing edges. A cascade tip baffle transversely bridges the two ribs above the tip floor forward of the maximum width of the tip to partition the tip chordally into corresponding tip pockets on opposite sides of the baffle.

23 Claims, 8 Drawing Sheets

U.S. PATENT DOCUMENTS

| | | | |
|---|---|---|---|
| 6,039,531 | A | 3/2000 | Suenaga et al. |
| 6,059,530 | A | 5/2000 | Lee |
| 6,086,328 | A | 7/2000 | Lee |
| 6,164,914 | A | 12/2000 | Correia et al. |
| 6,224,336 | B1 | 5/2001 | Kercher |
| 6,502,303 | B2 * | 1/2003 | Updegrove et al. .......... 29/889.1 |
| 6,527,514 | B2 | 3/2003 | Rueloffs |
| 6,554,575 | B2 | 4/2003 | Leeke et al. |
| 6,595,749 | B2 | 7/2003 | Lee et al. |
| 6,672,829 | B1 | 1/2004 | Cherry et al. |
| 6,790,005 | B2 | 9/2004 | Lee et al. |

FOREIGN PATENT DOCUMENTS

| | | |
|---|---|---|
| GB | 2155558 A | 9/1985 |
| JP | 11247612 A | 9/1999 |
| JP | 2002227606 A | 8/2002 |

OTHER PUBLICATIONS

U.S. Appl. No. 11/162,433, "Turbine Airfoil with Curved Squealer Tip," filed Sep. 9, 2005, M.E. Stegemiller et al.

U.S. Appl. No. 11/162,434, "Turbine Airfoil Curved Squealer Tip with Tip Shelf," filed Sep. 9, 2005, M.E. Stegemiller et al.

U.S. Appl. No. 11/507,119, filed Aug. 21, 2006, by K.S. Klasing et al.

U.S. Appl. No. 11/507,116, filed Aug. 21, 2006, by K.S. Klasing et al.

U.S. Appl. No. 11/507,121, filed Aug. 21, 2006, by K.S. Klasing et al.

U.S. Appl. No. 11/507,132, filed Aug. 21, 2006, by Ching-Pang Lee et al.

* cited by examiner

CASCADE TIP BAFFLE AIRFOIL

BACKGROUND OF THE INVENTION

The present invention relates generally to gas turbine engines, and, more specifically, to turbine blades therein.

In a gas turbine engine, air is pressurized in a compressor and mixed with fuel for generating combustion gases in a combustor. Various turbine stages extract energy from the combustion gases to power the engine and produce work.

A high pressure turbine (HPT) immediately follows the combustor and extracts energy from the hottest combustion gases to power the upstream compressor through one drive shaft. A low pressure turbine (LPT) follows the HPT and extracts additional energy from the combustion gases for powering another drive shaft. The LPT powers an upstream fan in a turbofan aircraft engine application, or powers an external shaft for marine and industrial applications.

Engine efficiency and specific fuel consumption (SFC) are paramount design objectives in modern gas turbine engines. The various turbine rotor blades and their corresponding nozzle vanes have precisely configured aerodynamic surfaces for controlling the velocity and pressure distributions thereover for maximizing aerodynamic efficiency.

The corresponding airfoils of the blades and vanes have generally concave pressure sides and generally convex suction sides extending axially in chord between opposite leading and trailing edges. The airfoil has a crescent profile in radial section, increasing rapidly in width from the leading edge to a maximum width region, and then decreasing in width gradually to the trailing edge.

The circumferentially or transversely opposite sides of the airfoils also extend radially in span from root to tip. The airfoils typically have thin sidewalls formed by casting of superalloy metals, with internal cooling circuits having various embodiments all specifically tailored for efficiently cooling the airfoils during operation while maximizing efficiency.

However, aerodynamic design of turbine airfoils is remarkably complex in view of the three dimensional (3D) configurations of the individual airfoils in complete rows thereof, and the correspondingly complex flow streams of the combustion gases channeled between the airfoils during operation. Adding to this complexity of design and environment are the special flow fields around the radially outer tips of the turbine blades which rotate at high speed inside a surrounding stationary shroud during operation.

The operating clearance or gap between the blade tips and the turbine shrouds should be as small as practical for minimizing leakage of the combustion gas flow therethrough while also permitting thermal expansion and contraction of the blades and shrouds without undesirable rubbing between the rotating tips and stationary shroud.

During operation, the blades in a turbine row drive the supporting rotor disk in rotation with the airfoil suction side leading the opposite airfoil pressure side. The airfoils typically twist from root to tip in the radial direction from the perimeter of the rotor disk, and the leading edges face upstream obliquely with the engine axial centerline axis to match the oblique discharge swirl angle of the cooperating nozzle vanes. The combustion gases flow generally in the axial downstream direction, with a circumferential or tangential component first engaging the airfoil leading edges in one flow direction, and then leaving the airfoils over the trailing edges thereof in a different flow direction.

The pressure and suction sides of the airfoils have correspondingly different 3D profiles for maximizing differential pressure therebetween and energy extraction from the hot combustion gases. The concave pressure side and the convex suction side effect different velocity and pressure distributions thereover which correspondingly vary between the leading and trailing edges, and from root to tip. However, the combustion gases which leak over the airfoil tips in the required tip clearance perform little, if any, useful work.

Further complicating turbine blade design is the exposed blade tips which are therefore bathed in the combustion gases which leak thereover during operation, and require suitable cooling thereof for ensuring a long useful life of the turbine blades during operation.

Modern turbine blade design typically incorporates squealer tip ribs which are small radial extensions of the pressure and suction sides of the airfoil from leading to trailing edge. The tip ribs are typically rectangular in cross section and spaced transversely or circumferentially apart to define an open tip cavity atop the airfoil which has an integral tip floor that encloses the typically hollow airfoil and the internal cooling circuit therein.

The small tip ribs provide sacrificial material in the event of a tip rub to protect the tip floor and internal cooling circuit from undesirable damage. The tip ribs increase the complexity of the combustion gas flow field introducing local secondary fields which affect turbine efficiency, flow leakage, and tip cooling.

The primary flow direction of the combustion gases is in the axially downstream direction in the flow passages defined between adjacent blades. The axial flow stream also varies along the radial direction from root to tip of each airfoil. And, these axial and radial flow variations are further compounded over the airfoil tip where the combustion gases leak between the pressure and suction sides of each airfoil.

Accordingly, the prior art is replete with various configurations of turbine blade tips addressing different problems and performance considerations including turbine efficiency, tip leakage, and tip cooling. These three important considerations are interdependent at least in part, but the complex 3D flow fields over the different pressure and suction sides at the airfoil tip and between the leading and trailing edges renders quite complex the evaluation thereof.

However, modern computational fluid dynamics (CFD) includes powerful software that improves the ability to mathematically analyze complex 3D flow streams in gas turbine engines and provides a mechanism from which further improvements in turbine blade design may be realized.

For example, it is desired to improve turbine blade tip design by reducing tip flow leakage, or increasing turbine efficiency, or improving tip cooling, or any combination of these factors either separately or together.

BRIEF DESCRIPTION OF THE INVENTION

A turbine blade includes an airfoil tip with first and second ribs extending along the opposite pressure and suction sides. The ribs extend outwardly from a tip floor and are joined together at opposite leading and trailing edges. A cascade tip baffle transversely bridges the two ribs above the tip floor forward of the maximum width of the tip to partition the tip chordally into corresponding tip pockets on opposite sides of the baffle.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
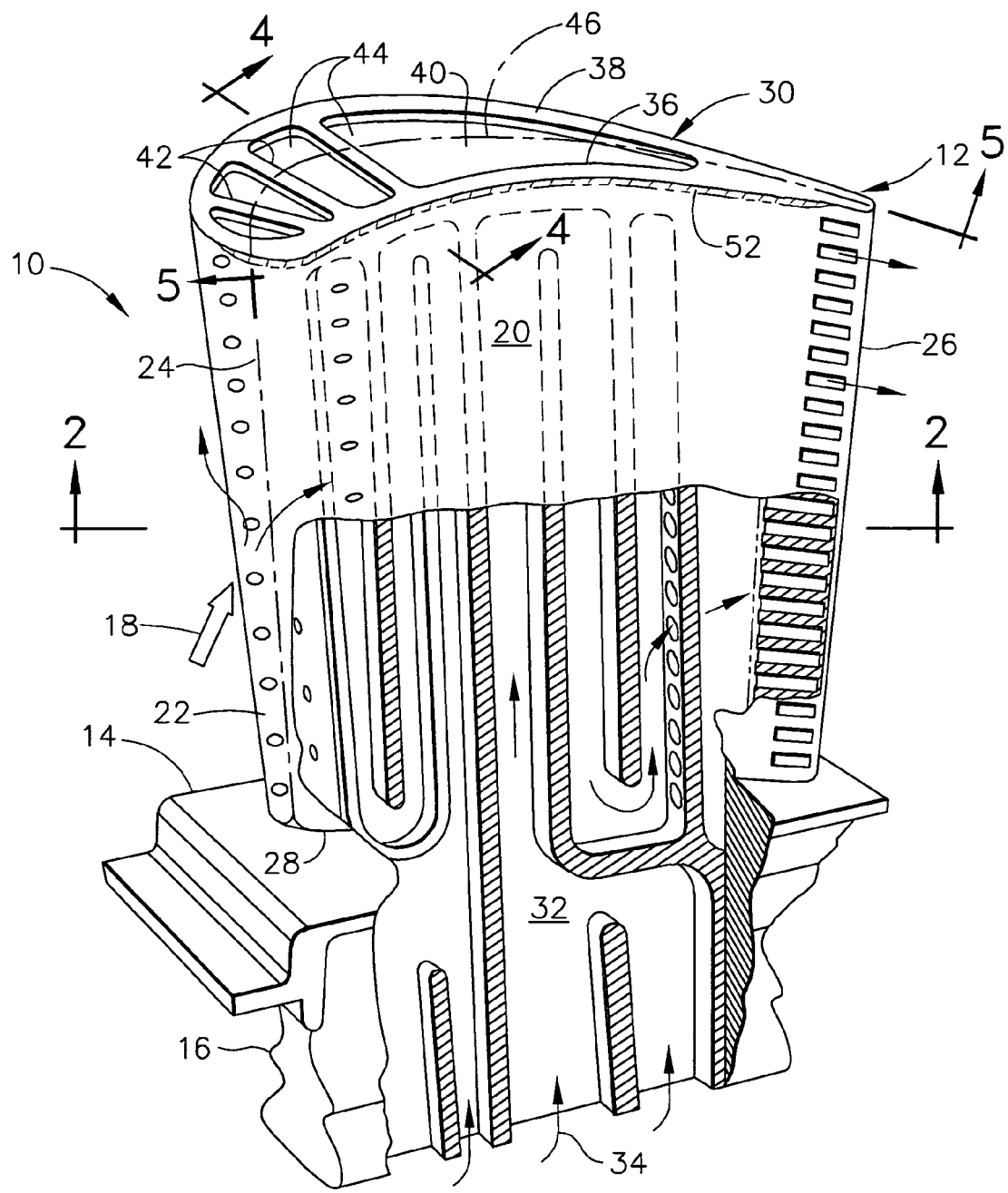
FIG. 1 is a partly sectional isometric view of an exemplary first stage turbine rotor blade.

FIG. 1 illustrates an exemplary first stage turbine rotor blade 10 for use in the HPT of a gas turbine engine. The blade is typically cast from superalloy metal with an airfoil 12, platform 14 at the root thereof, and a supporting dovetail 16 in an integral, one-piece assembly.

The dovetail 16 may have any conventional form, such as the axial-entry dovetail illustrated in FIG. 1, which mounts the blade in a corresponding dovetail slot in the perimeter of a supporting rotor disk (not shown). The disk holds a full row of the blades spaced circumferentially apart from each other to define inter-blade flow passages therebetween.

During operation, combustion gases 18 are generated in the combustor of the engine (not shown) and suitably channeled downstream over the corresponding turbine blades 10 which extract energy therefrom for powering the supporting rotor disk. The individual platform 14 provides a radially inner boundary for the combustion gases and adjoins adjacent platforms in the full row of turbine blades.

Figure 2:
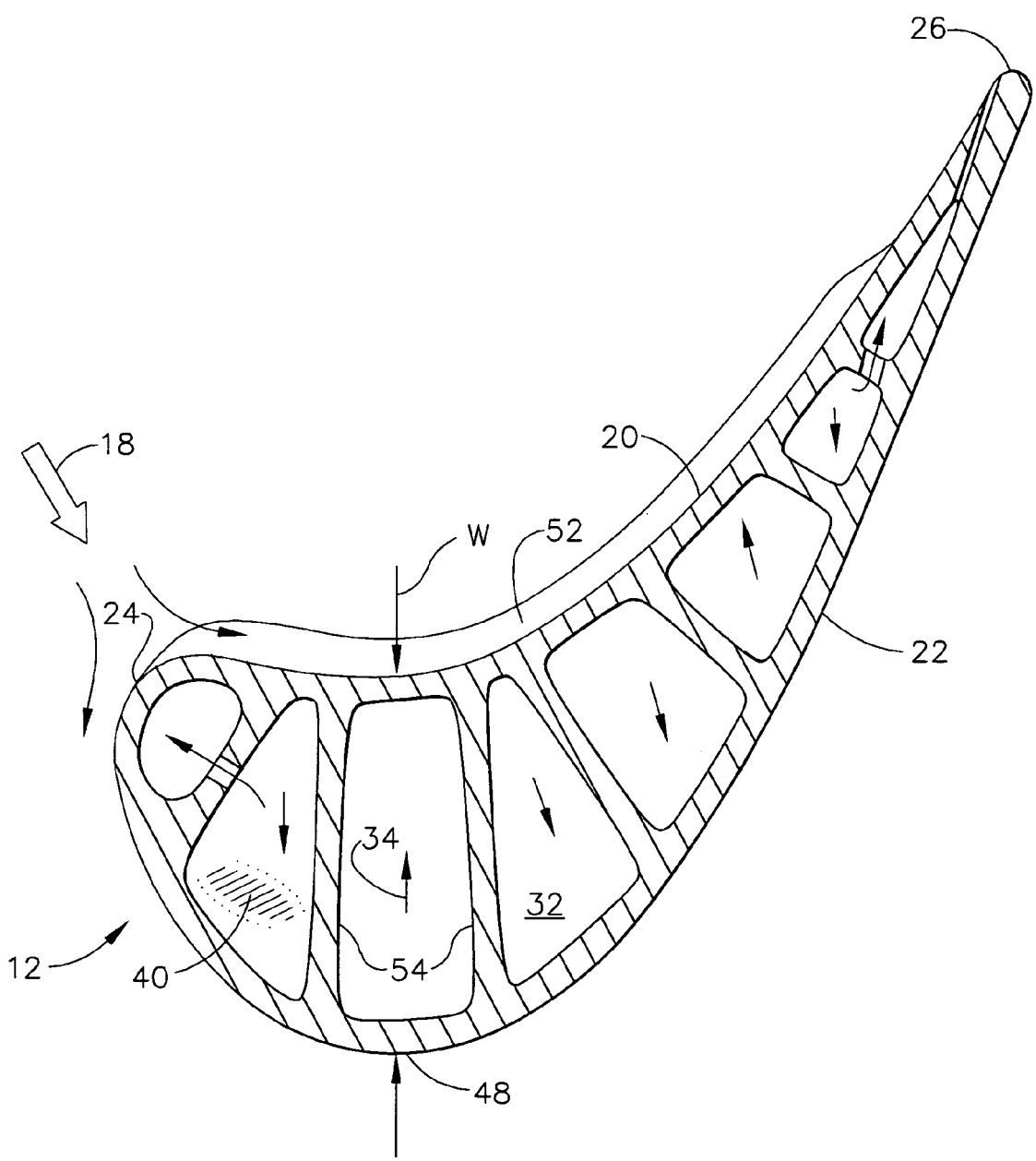
FIG. 2 is a radial sectional view through the turbine airfoil illustrated in FIG. 1 and taken along line 2-2.

The airfoil 12 illustrated in FIGS. 1 and 2 includes circumferentially or transversely opposite pressure and suction sides 20,22 extending axially in chord between opposite leading and trailing edges 24,26 and extends radially in span from the airfoil root 28 to terminate in a radially outer tip cap, or tip, 30. The airfoil pressure side 20 is generally concave between the leading and trailing edges and complements the generally convex airfoil suction side 22 between the leading and trailing edges.

The external surfaces of the pressure and suction sides 20,22 of the airfoil have the typical crescent shape or profile conventionally configured for effecting corresponding velocity and pressure distributions of the combustion gases thereover during operation for maximizing energy extraction from the gases.

The airfoil 12 is typically hollow and includes an internal cooling circuit 32 which may have any conventional configuration, such as the illustrated two three-pass serpentine circuits that terminate in corresponding flow passages behind the leading edge and in front of the trailing edge. The cooling circuit extends through the platform and dovetail with corresponding inlets in the base of the dovetail for receiving pressurized cooling air 34 from the compressor of the engine (not shown) in any conventional manner.

In this way, the blade is internally cooled from root to tip and between the leading and trailing edges by the internal cooling air which then may be discharged through the thin airfoil sidewalls in various rows of film cooling holes of conventional size and configuration.

Since the leading edge of the airfoil is typically subject to the hottest incoming combustion gases, dedicated cooling thereof is provided in any suitable manner. And, the thin trailing edge region of the airfoil typically includes a row of pressure side trailing edge cooling slots for discharging a portion of the spent cooling air.

As described above, the turbine airfoil 12 shown initially in FIG. 1 has a precisely configured 3D external profile which correspondingly affects the velocity and pressure distributions of the combustion gases 18 as they flow in the axial downstream direction from leading to trailing edges 24,26. The blades are attached to the perimeter of the supporting disk and rotate during operation, which generates secondary flow fields in the combustion gases with typically radially outwardly migration of the combustion gases along the span of the airfoil.

Furthermore, the relative pressure of the combustion gases on the pressure side 20 of the airfoil is higher than the pressure along the suction side of the airfoil, and along with the corresponding rotation of the blade during operation introduces further secondary or tertiary affects in the combustion gas flow field as it flows radially up and over the exposed airfoil tip 30 during operation.

The turbine rotor blade described above may be conventional in configuration and operation for use in a gas turbine engine, including for example the first stage of the HPT. The conventional blade may then be modified as described hereinbelow at the airfoil tip 30 to include first and second squealer tip ribs 36,38 which are radially integral extensions of the airfoil pressure and suction sides, or sidewalls, 20,22, respectively, and conform in profile or curvature therewith.

The first or pressure side rib 36 conforms chordally with the shape or profile of the concave pressure side 20 of the airfoil, and correspondingly, the second or suction side rib 38 conforms in chordal profile with the convex suction side 22 of the airfoil.

Figure 3:
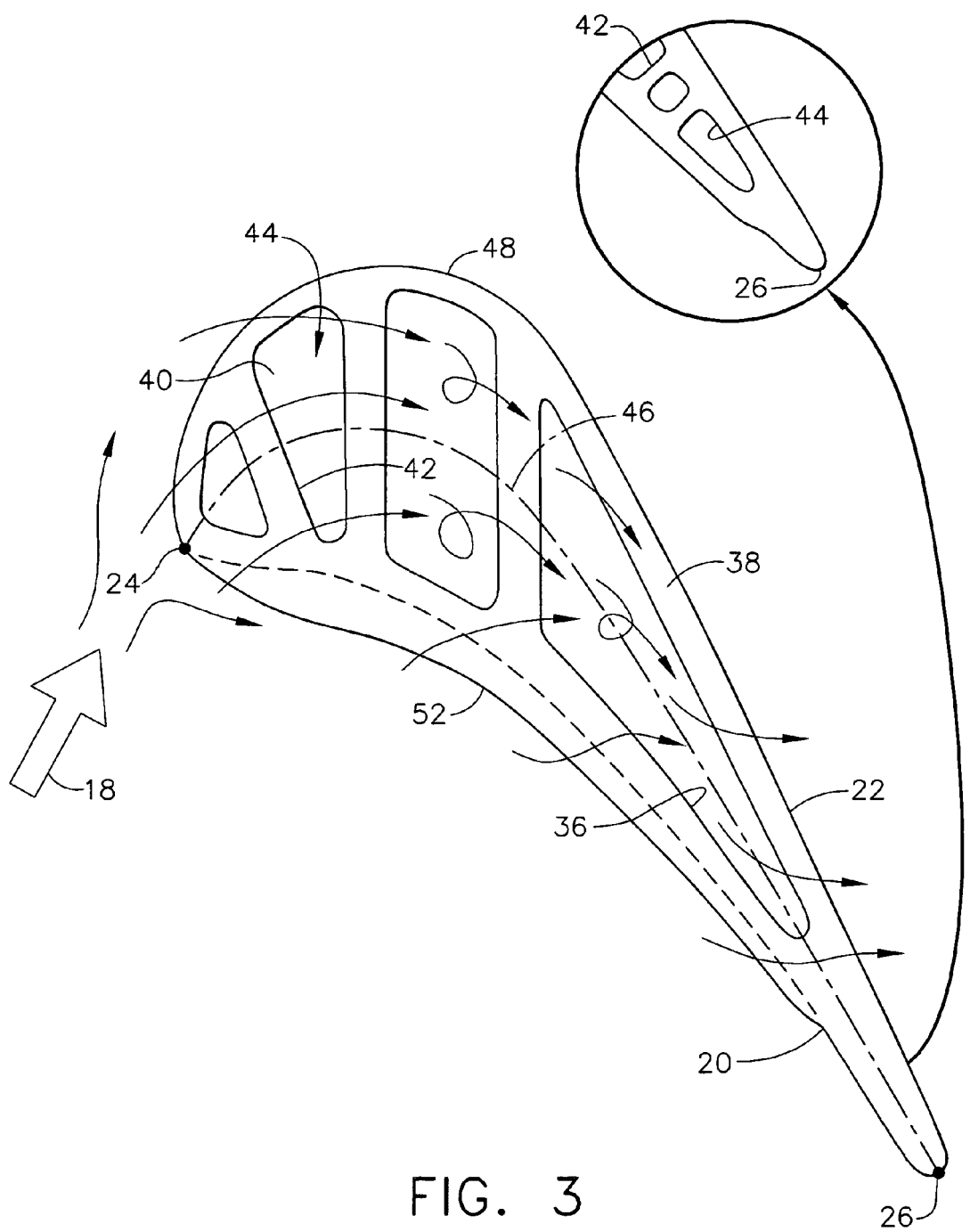
FIG. 3 is a top view of the airfoil tip illustrated in FIG. 1.
Figure 4:
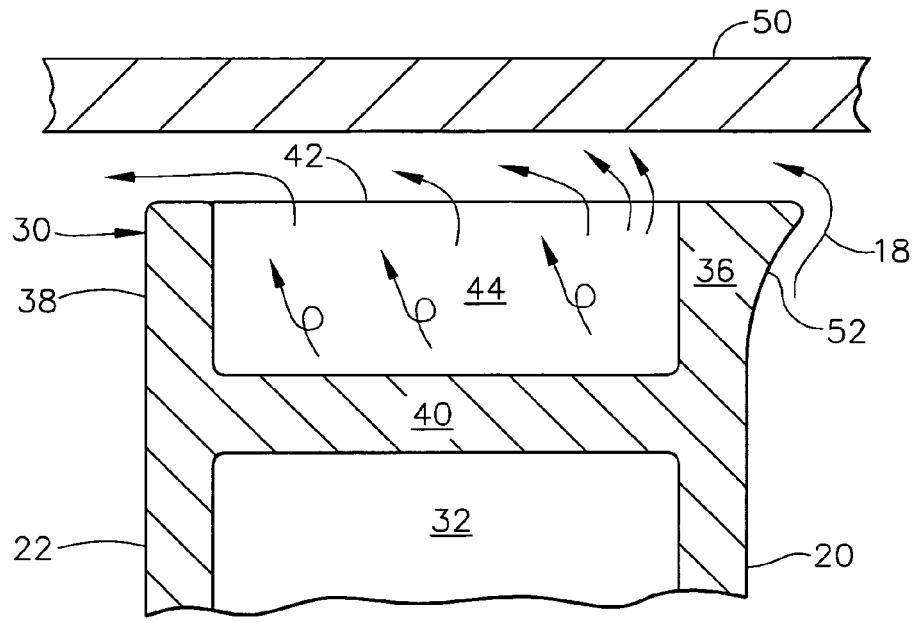
FIG. 4 is a radial sectional view of the airfoil tip illustrated in FIG. 1 and taken along line 4-4, and mounted inside a surrounding turbine shroud.

The two ribs 36,38 shown in FIGS. 1, 3, and 4 extend radially outwardly from a common tip floor 40 which encloses the hollow airfoil and bounds the internal cooling circuit 32 therein. The floor 40 may be imperforate, or may include a small or limited number of cooling holes and larger dust holes (not shown) for discharging some of the spent cooling air 34 from the internal cooling circuit 32.

The airfoil tip further includes one or more cascade baffles or ribs 42 that transversely or circumferentially bridge the first and second ribs 36,38 on opposite sides of the airfoil above the common tip floor 40. The one or more tip baffles 42 partition the airfoil tip chordally or axially into two or more corresponding tip cavities or pockets 44 on opposite forward and aft sides of the corresponding tip baffle.

As initially shown in FIGS. 1 and 2, the airfoil 12 has the typical aerodynamic, crescent shape or profile, with the pressure side 20 being generally concave, and the circumferentially opposite suction side 22 being generally convex between the opposite leading and trailing edges. A mean line or camber line 46 equally divides the airfoil transversely between the opposite sides from the leading edge to the trailing edge and is correspondingly concave towards the pressure side and convex towards the suction side.

The airfoil correspondingly increases rapidly in transverse width W as shown in FIG. 2 from the leading edge 24 downstream or aft to a hump 48 at the maximum width of the airfoil, and then decreases gradually in width aft to the opposite trailing edge 26. The airfoil suction side along the hump 48 has maximum convex curvature for maximizing the differential pressure of the combustion gases across the airfoil for efficiently extracting energy from the combustion gases as they flow downstream over the opposite sides of the airfoil.

At least one of the exemplary tip baffles 42 illustrated in FIGS. 1 and 3 transversely bridges the tip ribs 36,38 forward of the maximum width of the airfoil tip in the forward portion of the tip. The tip baffles integrally join the opposite tip ribs 36,38 at a suitable spacing aft of the leading edge and are disposed generally oblique or perpendicular thereto relative to the camber line extending aft between the leading and trailing edges.

The first tip baffle 42 is spaced aft from the leading edge along both first and second ribs 36,38 to define a forward tip pocket 44 directly behind the leading edge, and the baffle 42 is disposed obliquely to the leading edge to transversely distribute flow streamlines of the combustion gases 18 in a cascade aft over the baffle toward the trailing edge.

FIG. 3 illustrates schematically exemplary streamlines of the combustion gases 18 during operation. The gases 18 have a generally normal incidence angle against the airfoil leading edge and split in respective portions that flow along the opposite pressure and suction sides of the airfoil. The gases flow generally in the axially downstream direction along the camber or chord lines of the airfoil between the leading and trailing edges.

Since the gas pressure on the pressure side of the airfoil is relatively higher than on the suction side of the airfoil, a small portion of the gases will leak circumferentially or transversely over the airfoil tip 30 during operation as shown in FIG. 4.

Figure 5:
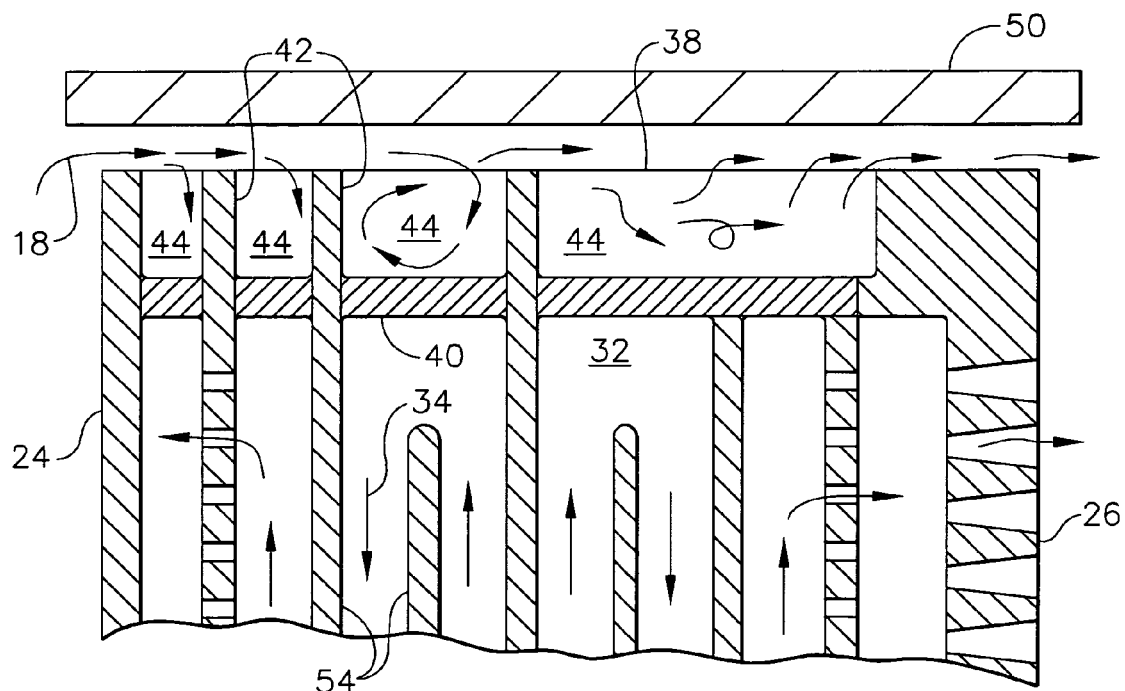
FIG. 5 is an axial sectional view of the airfoil tip illustrated in FIG. 1 along the camber line and taken along line 5-5.

FIGS. 4 and 5 illustrate a portion of the surrounding turbine shroud 50 which is mounted around a full row of the turbine rotor blades with a relatively small clearance or radial gap therebetween. The flow streamlines shown in FIG. 4 illustrate circumferential leakage of the combustion gases from the airfoil pressure side 20 to the airfoil suction side and in the small gap between the airfoil tip and shroud. And, FIG. 5 illustrates axial tip flow leakage.

Accordingly, the flow streamlines 18 initially illustrated in FIG. 3 have two components of leakage over the airfoil tip in the axial or chordal downstream direction and in the circumferential or transverse direction in the direction of blade rotation.

By specifically introducing one or more of the tip baffles 42 to transversely bridge the pressure and suction side squealer ribs 36,38 in the forward portion of the airfoil tip, the incident combustion gas streamlines may be distributed transversely across the baffle in the form of a uniform cascade or waterfall in the downstream direction along the camber line. In this way, the flow streamlines over the airfoil tip may engage the first tip baffle 42 substantially normal thereto.

As indicated above, the velocity and pressure distributions of the combustion gases flowing over the airfoil during operation are highly complex in three dimensions. Further complicating the flow regime is the leakage of the combustion gases over the airfoil tip.

Turbine efficiency is evaluated by the ability of the turbine airfoil to extract energy from the combustion gases. And, turbine efficiency is typically interdependent with combustion gases leakage over the airfoil tip. Tip leakage typically reduces turbine efficiency.

Yet, as further described hereinbelow, the one or more tip baffles 42 specifically introduced into the airfoil tip may substantially increase turbine efficiency with an associated reduction in tip leakage, or with an associated increase in tip leakage depending upon the specific design. In either case, significant improvement in turbine efficiency may be obtained by the introduction of one or more of the cascade tip baffles.

In the exemplary embodiment illustrated in FIGS. 1-5, only three of the cascade tip baffles 42 bridge the opposite first and second tip ribs 36,38 to correspondingly partition the airfoil tip into four tip pockets 44 following each other in turn along the camber line.

The several tip baffles 42 have opposite ends which obliquely join the opposite tip ribs 36,38 spaced aft from the leading edge 24 as shown in FIGS. 1 and 3. The three baffles 42 define a forward tip pocket directly behind the leading edge, an aft tip pocket directly in front of the trailing edge, and two middle tip pockets chordally therebetween.

Since the forward pocket 44 is disposed directly behind the leading edge where the airfoil diverges in width, the forward pocket itself also diverges in width aft from the leading edge to the first baffle 42.

Correspondingly, the airfoil converges or decreases in width from the hump 48 to the trailing edge 26, and similarly the aft tip pocket 44 disposed directly in front of the trailing edge 26 converges in width from its upstream baffle 42 to the downstream trailing edge 26. And, the two middle pockets 44 have corresponding profiles and perimeters to match the changing profile in the forward hump region of the airfoil.

As shown in FIGS. 1 and 3-5, the two ribs 36,38 provide a full perimeter boundary around the airfoil tip. The one or more tip baffles 42 transversely bridge the two ribs and are coplanar in elevation therewith above the common tip floor 40. Each of the tip pockets 44 is therefore fully enclosed or surrounded by the intersecting ribs and baffles, and is closed along the bottom floor 40 while being fully open and exposed at corresponding outer mouths or inlets directly facing the surrounding turbine shroud.

In this configuration, the transverse tip baffles 42 provide corresponding cascades over which flow the combustion gases in the axially downstream direction over the corresponding tip pockets in sequence or in turn. The tip pockets are disposed in successive flow communication in the downstream direction to transversely distribute the upstream streamlines downstream over the corresponding tip baffles following in parallel flow the camber line of the airfoil tip.

In a preferred embodiment illustrated in FIG. 3, the first two tip baffles 42 are disposed forward of the hump 48, and the remaining, third tip baffle 42 is disposed closely aft of the hump in the forward portion of the airfoil having maximum change in curvature. From the third tip baffle, the airfoil tapers smaller in transverse width with gradual change in surface profile of the opposite pressure and suction sides of the airfoil in the aft portion thereof terminating at the thin trailing edge 26.

The three tip baffles 42 illustrated in FIG. 3 are preferably straight transversely between the opposite first and second ribs 36,38, and are disposed obliquely to the camber line 46, and generally perpendicular thereto.

Advanced CFD analysis has been conducted to evaluate the aerodynamic performance of the first embodiment illustrated in FIGS. 1-5. The introduction of the transverse tip baffles 42 effects corresponding resistance to tip leakage of the combustion gases as they flow in the axial downstream direction along the camber line. A significant increase in turbine efficiency is predicted from the analysis due to the transverse tip baffles as compared with a reference airfoil tip without any of the tip baffles illustrated in the Figures.

However, the cascade flow of the combustion gases over the tip baffles introduces additional pressure losses in the tip pockets. Such pressure losses will decrease the gas pressure in the tip-shroud clearance and allow increased leakage of the combustion gases in the circumferential direction in the aft region of the airfoil tip.

FIG. 3 illustrates schematically exemplary gas streamlines as they flow over the several tip pockets in the downstream direction, generally along the camber line in succession. The long aft tip pocket covers most of the aft region of the airfoil, and is relatively thin where the combustion gases leak circumferentially thereover from the pressure side to the suction side during operation.

Accordingly, the circumferential tip leakage is biased in the aft region of the airfoil tip and minimizes its adverse effect on turbine efficiency. Turbine efficiency may nevertheless be increased by introducing the cascade tip baffles, notwithstanding an associated increase in tip leakage.

However, the exemplary embodiment illustrated in FIGS. 1-4 may also include an arcuate flare 52 along the pressure side of the first rib 36 between the leading and trailing edges of the airfoil. This flare is an independent feature which may introduced in the airfoil tip for reducing circumferential leakage of the combustion gases over the airfoil tip.

In this way, the tip leakage associated with the introduction of the cascade tip baffles may be reduced or compensated by the introduction of the pressure side tip flare 52 for further enhancing performance of the airfoil. The flare also significantly increases turbine efficiency.

In the first embodiment illustrated in FIGS. 1-5, a plurality of the tip baffles 42 join the opposite tip ribs 36,38 to define corresponding tip pockets spaced successively in turn in the downstream or chordal direction along the camber line. These several baffles 42 are preferably disposed in the forward portion of the airfoil tip between the leading edge 24 and the hump 48 of maximum airfoil width, and including that hump region. The remaining aft portion of the airfoil tip converges to the trailing edge, with the aft tip pocket 44 correspondingly converging in width behind the last or third tip baffle 42.

The converging aft pocket therefore receives the cascade tip flow from the upstream pockets in turn, and channels the collective flow aft inside the aft pocket. The tip flow then leaks from the aft pocket along the suction side rib 38, with additional circumferential leakage from the airfoil pressure side over the corresponding pressure side rib 36 and then over the second rib 38.

Figure 6:
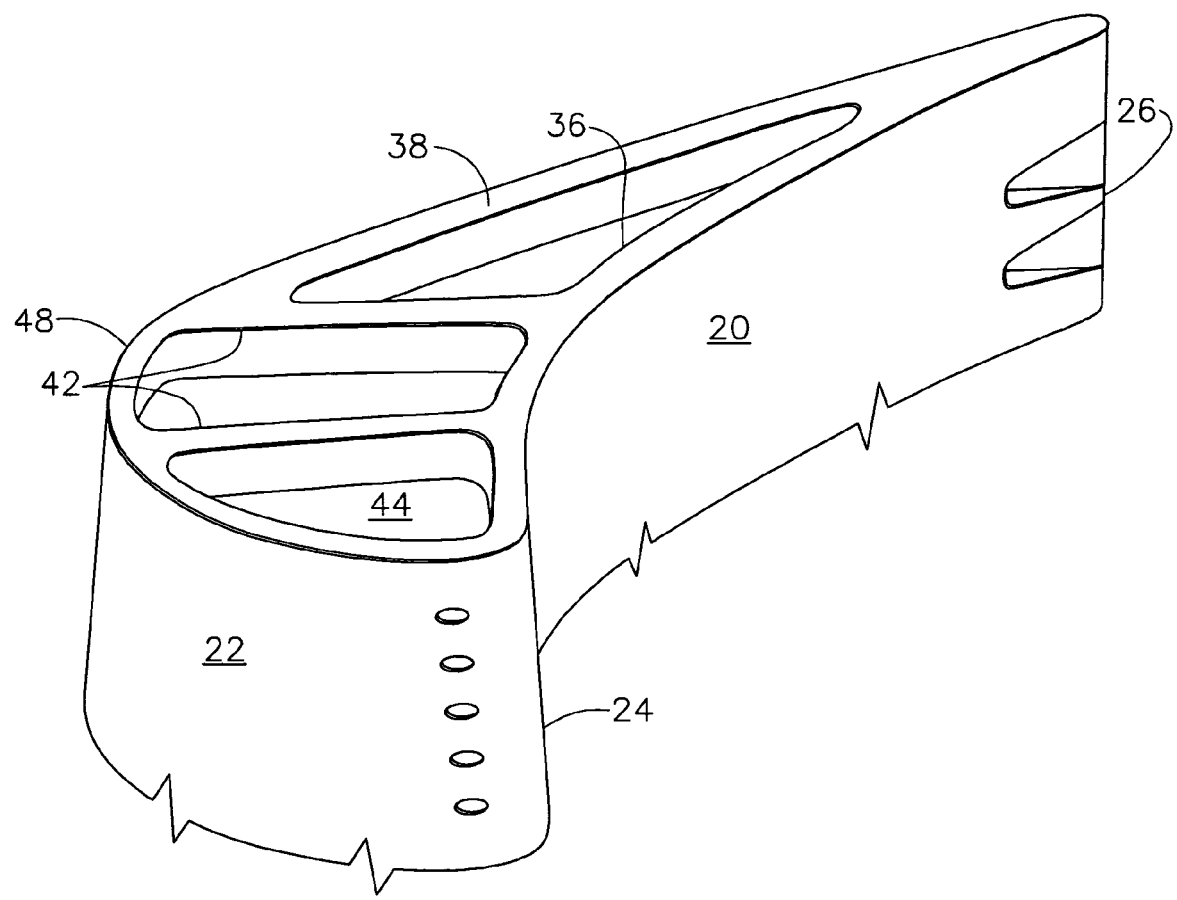
FIG. 6 is an isometric view of the airfoil tip illustrated in FIG. 1 in accordance with another embodiment.

FIG. 6 illustrates another embodiment in which the first rib 36 has a generally rectangular cross section with straight sides, like the second rib 38, and without the use of the independent flare 52 illustrated in FIG. 4. In this embodiment, only two of the tip baffles 42 are used, instead of the three baffles illustrated in FIG. 3.

The two baffles 42 are spaced chordally apart between the leading and trailing edges 24,26 to partition the tip into forward, middle, and aft tip pockets 44. The two baffles 42 transverse the opposite ribs 36,38 generally parallel to each other to transversely distribute the flow streamlines in successive cascade flow downstream thereover in turn.

Limiting the number of tip baffles 42 to two, correspondingly limits partitioning of the airfoil tip into only three of the tip pockets 44 which have corresponding perimeter profiles conforming to the local change in curvature along the opposite pressure and suction sides of the airfoil.

The two tip baffles 42 are preferably disposed in the forward portion of the tip including the hump 48 for maximizing their affect on the incoming leakage flow, with the aft tip pocket 44 converging over the narrowing aft portion of the airfoil tip. Preferably, the first tip baffle 42 is disposed forward of the hump 48, with the second or last tip baffle 42 being disposed near or closely aft of the hump 48.

Figure 7:
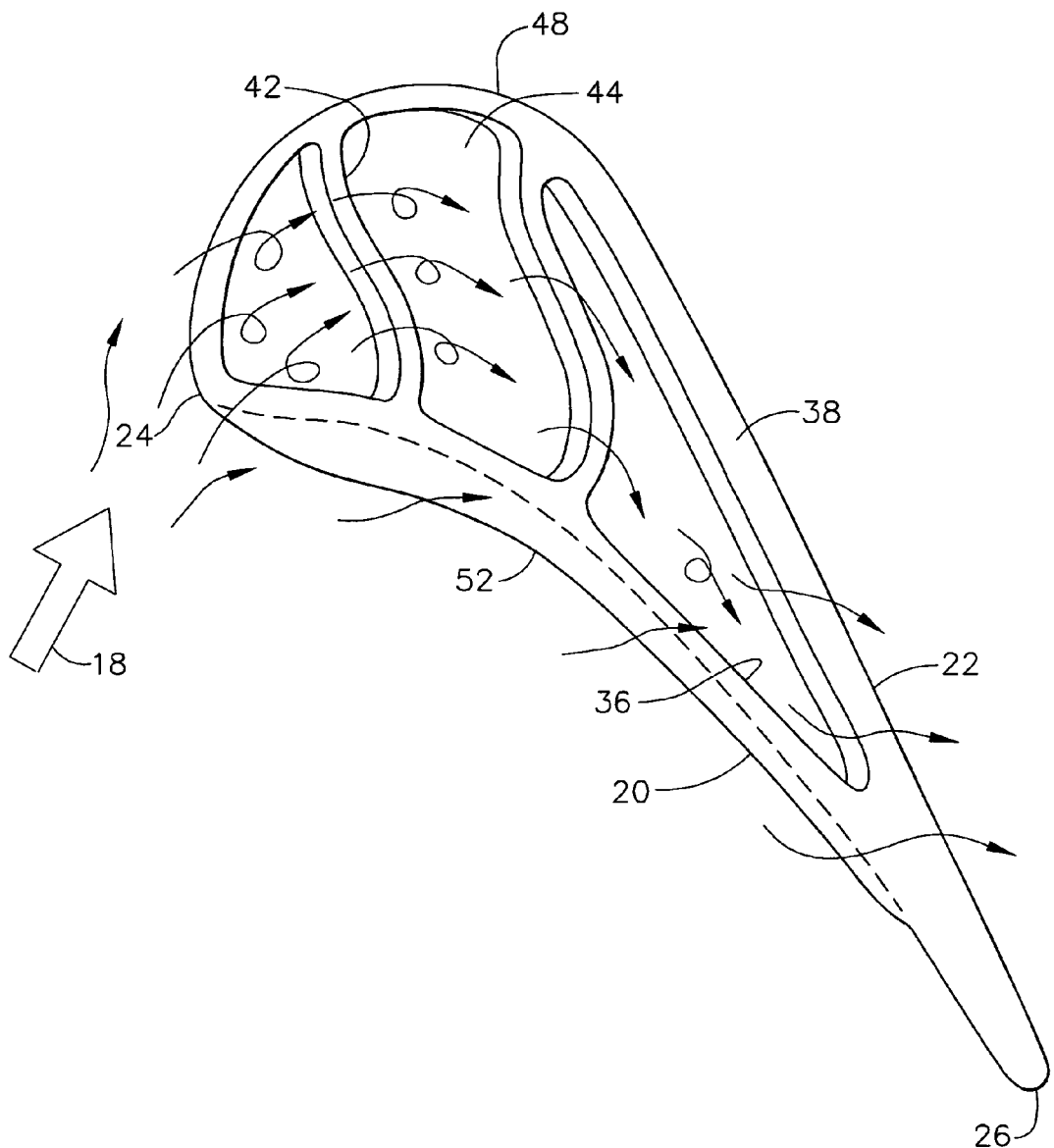
FIG. 7 is a top view of an airfoil tip for the blade illustrated in FIG. 1 in accordance with another embodiment.

FIG. 7 illustrates another embodiment of the two-tip baffle airfoil tip, like FIG. 6. In FIG. 6, the transverse tip baffles 42 are preferably straight between the opposite ribs, whereas in FIG. 7, the tip baffles 42 are serpentine in transverse profile between the opposite first and second ribs 36,38.

In this embodiment, both baffles 42 are concave forward in profile toward the leading edge 24 where they join the first rib 36, while being convex forward toward the leading edge 24 where they join the second rib 38.

Correspondingly, the two baffles are convex aft towards the trailing edge 26 where they join the first rib 36, and concave aft toward the trailing edge where they join the second rib 38.

In this way, both tip baffles 42 have a generally constant thickness between their opposite forward and aft sides and may integrally join the opposite first and second ribs 36,38 substantially normal thereto.

Furthermore, the pressure side aft ends of the two baffles 42 may be located further aft than their suction side forward ends to conform more normally to the incident combustion gas streamlines as they flow aft over the airfoil leading edge region bridging both the pressure and suction sides of the airfoil in the forward portion thereof.

The embodiment illustrated in FIG. 7 also includes the pressure side flare 52 in the same manner as illustrated in the first embodiment described above.

The three-baffle embodiment illustrated in FIG. 3 enjoys the highest efficiency increase over the baseline design as predicted by the CFD analysis. However, that efficiency increase is offset by a small increase in tip leakage.

In contrast, the two-baffle embodiment illustrated in FIG. 7 enjoys a slightly lower increase in turbine efficiency, but with a small decrease in tip flow leakage.

Figure 8:
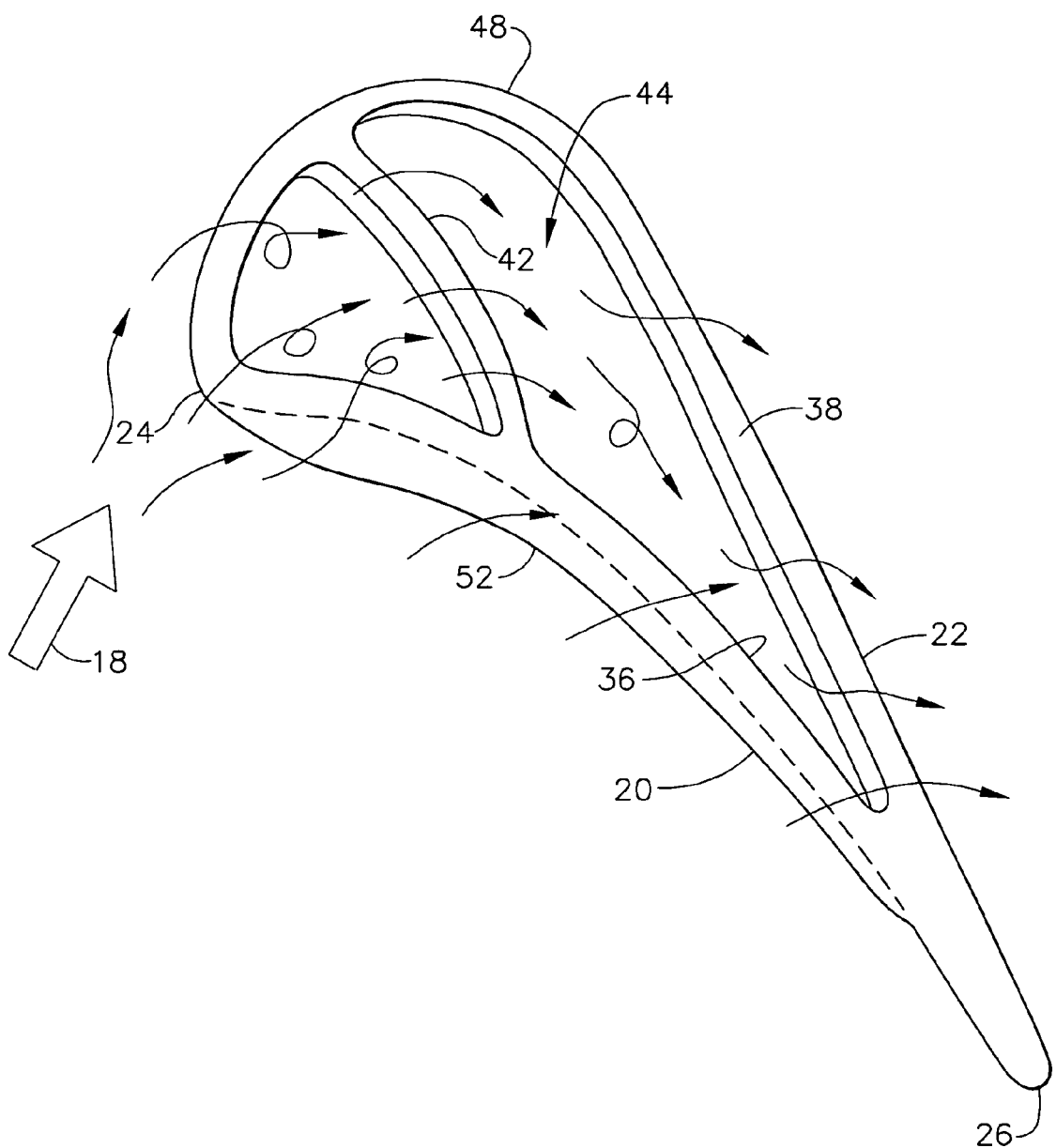
FIG. 8 is a top view of an airfoil tip for the blade illustrated in FIG. 1 in accordance with another embodiment.

FIG. 8 illustrates yet another embodiment of the turbine blade illustrated in FIG. 1 in which a single tip baffle 42 bifurcates the airfoil tip 30 into a single forward tip pocket 44 directly behind the leading edge 24, and a single aft tip pocket 44 directly forward of the trailing edge 26. The two large tip pockets 44 follow the corresponding profiles of the differently shaped forward and aft portions of the airfoil tip.

For example, the single tip baffle 42 is arcuate in transverse profile between the two ribs 36,38, and is preferably concave forward toward the leading edge 24 and convex aft toward the trailing edge 26. The single tip baffle 42 may therefore have a substantially constant thickness between its forward and aft sides which is substantially equal to the corresponding thicknesses of the second rib 38, and the first rib 36 below the integral flare 52.

The single baffle 42 preferably joins the second rib 38 forward of the hump 42, and preferably closely adjacent thereto. And, the baffle 42 joins the first rib 36 aft of the hump or location of maximum tip thickness, and closely adjacent thereto. In this way, the middle of the baffle 42 crosses the hump region of the airfoil obliquely thereto and faces the leading edge 24 substantially normal thereto.

CFD analysis of the FIG. 8 embodiment predicts another high improvement in turbine efficiency, and with a substantial reduction in tip leakage.

Figure 9:
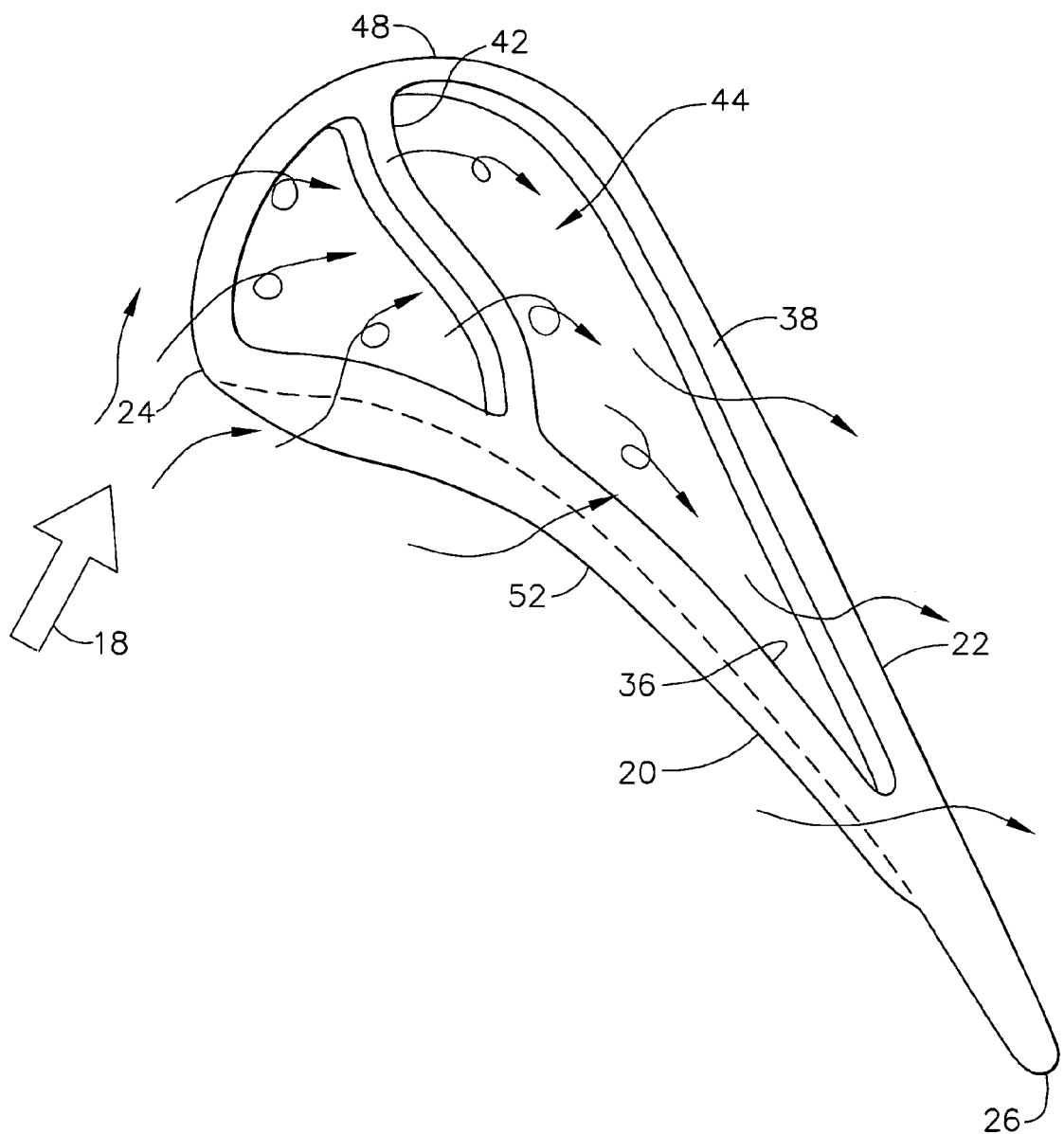
FIG. 9 is a top view of an airfoil tip for the blade illustrated in FIG. 1 in accordance with another embodiment.

FIG. 9 illustrates another embodiment, like FIG. 8, which includes a single tip baffle 42 bifurcating the airfoil tip into the forward and aft tip pockets 44. However, the tip baffle 42 illustrated in FIG. 9 is serpentine like the two tip baffles illustrated in FIG. 7 described above, with the forward end of the baffle joining the second rib 38 forward of the aft end junction with the first rib 36.

The single serpentine baffle 42 has a generally constant thickness and is concave forward and convex aft where it joins the first rib 36, and is convex forward and concave aft where it joins the second rib 38. The serpentine baffle joins both ribs 36,38 substantially normal thereto, while facing forward toward the leading edge 24 for receiving the incident leakage of the combustion gases over the airfoil tip during operation.

The differences in configuration between the cascade tip embodiments illustrated in FIGS. 8 and 9 appear relatively small, but have a profound affect on aerodynamic performance. The CFD analysis predicts a slightly less increase in turbine efficiency for the FIG. 9 embodiment over the FIG. 8 embodiment, but with an increase in tip leakage as opposed to a decrease in tip leakage for the FIG. 8 embodiment.

The different embodiments described above share the cascade tip baffles 42 transversely bridging the opposite pressure and suction side tip ribs 36,38 for chordally partitioning the airfoil tip in multiple tip pockets. The number of tip baffles 42 may be varied from one, two, and three or more, as desired to partition the tip into two or more tip pockets.

The transverse shape or profile of the tip baffles may be varied from straight, arcuate, and serpentine, for example, and the baffles may extend obliquely between the opposite ribs at various inclination angles.

The corresponding shape or perimeter profile and size of the individual tip pockets may therefore vary as dictated by the configuration of the tip baffles. And, the specific aerodynamic profile of the airfoil tip transversely between the concave pressure side and convex suction side and axially or chordally between the opposite leading and trailing edges cooperates with the cascade baffles in determining the corresponding configurations of the multiple tip pockets.

The CFD analysis indicated above predicts significant improvement or increase in turbine efficiency attributable to the various forms of cascade baffles described above. However, associated with the efficiency improvement is the corresponding magnitude of tip flow leakage which varies from an increase in leakage to a decrease in leakage depending upon the specific design selected and the particular aerodynamic performance of the turbine airfoil itself.

FIG. 3 illustrates yet another embodiment of the cascade tip baffle airfoil in which two more of the tip baffles 42 have been added to the original three baffles, for a total of five baffles. The last two baffles are introduced near the airfoil trailing edge, see the circle enlargement, to partition the tip into six successive tip pockets 44. In a direct comparison of the three-baffle tip and substantially identical five-baffle tip, the five-baffle tip experienced a slight reduction in efficiency improvement as predicted by CFD analysis, with the same amount of increase in tip flow leakage.

The basic three-baffle embodiment illustrated in FIG. 3 enjoyed the highest efficiency increase of the several embodiments disclosed above, yet, however, with an increase in tip flow leakage.

The single-baffle embodiment illustrated in FIG. 8 enjoyed almost as high an improvement in turbine efficiency, but with the greatest decrease in tip flow leakage.

Accordingly, the various forms of cascade tip baffles disclosed above in various quantities may be selected for specific turbine blade designs for maximizing efficiency while reducing tip flow leakage as the design constraints dictate. Since the addition of the cascade baffles correspondingly increases blade weight subject to centrifugal forces during operation, those forces and corresponding centrifugal stress may also be used in determining the size and quantity of cascade baffles used for particular designs.

And, effective cooling of the cascade baffles may also affect the specific design selected, with cooling of the baffle typically being provided by cooling apertures (not shown) extending through the tip floor for feeding the several tip pockets with spent cooling air from inside the airfoil.

The exemplary cooling circuit 32 illustrated in FIGS. 1, 2, and 5 has multiple radial flow channels separated by corresponding partitions 54 which integrally bridge the opposite pressure and suction sides of the airfoil. In the first embodiment, the corresponding tip baffles 42 may be integral radial extensions of respective ones of the internal partitions 54 extending through the tip floor 40.

In FIG. 5, tip floor 40 may be formed of individual or discrete metal pieces brazed into the corresponding tip pockets and flow channels during manufacture. The common partition-baffle embodiment may be readily cast using corresponding ceramic cores extending the full radial height of the channels and airfoil tip.

Following casting, the open pockets and flow channels may be closed by brazing therein the corresponding pieces of the tip floor at preferably the same depth from the radially outer ends of the common height first and second ribs 36,38 and tip baffles 42.

The various embodiments disclosed above indicate that the simple introduction of even one cascade tip baffle in the forward portion of the airfoil tip can significantly improve turbine efficiency while also reducing tip flow leakage. The specific design of the cascade tip baffle airfoil is sensitive to the highly complex 3D flow distribution over the opposite sides of the airfoil and through the tip-shroud clearance gap. Modern CFD analysis may therefore be used to evaluate variations in the cascade tip design for maximizing turbine efficiency while minimizing tip flow leakage where possible.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

The invention claimed is:
1. A turbine blade comprising:
a hollow airfoil, platform, and integral dovetail;
said airfoil including opposite pressure and suction sides extending in span from root to tip and in chord between leading and trailing edges;
said tip including first and second ribs extending outwardly from a tip floor along said pressure and suction sides, respectively, and joined together at said leading and trailing edges; and
a cascade tip baffle transversely bridging said first and second ribs in a one-piece metal casting above said tip floor forward of the maximum width of said tip to partition said tip chordally into corresponding tip pockets on opposite sides of said baffle
wherein said tip baffle is spaced aft from said leading edge along both said first and second ribs to define a forward tip pocket directly behind said leading edge, and said baffle is disposed obliquely to said leading edge to transversely distribute flow streamlines in a cascade aft over said baffle toward said trailing edge
wherein said tip baffle obliquely joins said first and second ribs behind said leading edge, and said forward tip pocket diverges in width aft from said leading edge, and an aft tip pocket converges in width between said baffle and trailing edge; and wherein said first and second ribs and tip baffle are coplanar in elevation above said tip floor and fully surround said tip pockets.

2. A blade according to claim 1 wherein said tip baffle is single and bifurcates said airfoil tip into a single forward tip pocket directly behind said leading edge and a single aft tip pocket directly forward of said trailing edge.

3. A blade according to claim 2 wherein said tip baffle joins said second rib forward of said maximum tip width, and joins said first rib aft of said maximum tip width.

4. A blade according to claim 1 further comprising two of said tip baffles spaced chordally apart between said leading and trailing edges to partition said tip into forward, middle, and aft tip pockets, and said baffles transversely bridge said first and second ribs in parallel to transversely distribute flow streamlines in successive cascade flow downstream thereover in turn.

5. A blade according to claim 4 wherein said two tip baffles are disposed in a forward portion of said tip including said maximum tip width, with one baffle disposed forward of said maximum tip width, and the second baffle disposed aft of said maximum tip width.

6. A blade according to claim 1 further comprising three of said tip baffles bridging said first and second ribs and partitioning said tip into four tip pockets, and said baffles transversely bridge said first and second ribs in parallel to transversely distribute flow streamlines in successive cascade flow downstream thereover in turn.

7. A blade according to claim 6 wherein two of said tip baffles are disposed forward of said maximum tip width, and the remaining tip baffle is disposed aft of said maximum tip width.

8. A turbine blade comprising an airfoil tip having a pressure-side first rib joined to a suction-side second rib at opposite leading and trailing edges and extending outwardly from a tip floor, and a cascade tip baffle bridging said first and second ribs in a one-piece metal casting above said tip floor forward of the maximum width of said tip to partition said tip chordally into corresponding tip pockets on opposite sides of said baffle;

further comprising an airfoil having a concave pressure side and an opposite convex suction side and increasing in transverse width there between from said leading edge to a hump at said maximum width, and decreasing in width to said opposite trailing edge, and said tip baffle integrally joins said first and second ribs aft of said leading edge and oblique thereto to define a forward tip pocket behind said leading edge and transversely distribute flow streamlines in a cascade aft thereover;

wherein said forward pocket diverges in width aft therefrom;

further comprising an aft tip pocket converging in width between said tip baffle and said trailing edge, and disposed in cascade flow communication with said forward pocket over said tip baffle; and wherein said tip baffle is concave forward towards said leading edge, or said tip baffle is convex aft toward said trailing edge, or said tip baffle is serpentine transversely between said first and second ribs.

9. A blade according to claim 8 wherein said tip baffle is concave forward toward said leading edge at said first rib, and convex forward toward said leading edge at said second rib.

10. A blade according to claim 8 wherein said tip baffle is substantially normal to said first and second ribs.

11. A turbine blade comprising an airfoil tip having a pressure-side first rib joined to a suction-side second rib at opposite leading and trailing edges and extending outwardly from a tip floor, and a cascade tip baffle bridging said first and second ribs in a one-piece metal casting above said tip floor forward of the maximum width of said tip to partition said tip chordally into corresponding tip pockets on opposite sides of said baffle;

further comprising an airfoil having a concave pressure side and an opposite convex suction side and increasing in transverse width there between from said leading edge to a hump at said maximum width, and decreasing in width to said opposite trailing edge, and said tip baffle integrally joins said first and second ribs aft of said leading edge and oblique thereto to define a forward tip pocket behind said leading edge and transversely distribute flow streamlines in a cascade aft thereover;

wherein said forward pocket diverges in width aft therefrom;

further comprising an aft tip pocket converging in width between said tip baffle and said trailing edge, and disposed in cascade flow communication with said forward pocket over said tip baffle; and wherein said tip baffle is single and bifurcates said airfoil tip into a single forward tip pocket directly behind said leading edge and a single aft tip pocket directly forward of said trailing edge.

12. A blade according to claim 11 wherein said tip baffle joins said second rib forward of said hump, and joins said first rib aft of said hump.

13. A blade according to claim 11 wherein said tip baffle is concave forward toward said leading edge, and convex aft toward said trailing edge.

14. A blade according to claim 11 wherein said tip baffle is concave forward toward said leading edge at said first rib, and convex forward toward said leading edge at said second rib.

15. A turbine blade comprising an airfoil tip having a pressure-side first rib joined to a suction-side second rib at opposite leading and trailing edges and extending outwardly from a tip floor, and a cascade tip baffle bridging said first and second ribs in a one-piece metal casting above said tip floor forward of the maximum width of said tip to partition said tip chordally into corresponding tip pockets on opposite sides of said baffle;

the turbine blade further comprising an airfoil having a concave pressure side and an opposite convex suction side and increasing in transverse width there between from said leading edge to a hump at said maximum width, and decreasing in width to said opposite trailing edge, and said tip baffle integrally joins said first and second ribs aft of said leading edge and oblique thereto to define a forward tip pocket behind said leading edge and transversely distribute flow streamlines in a cascade aft thereover, wherein said forward pocket diverges in width aft therefrom;

the turbine blade further comprising an aft tip pocket converging in width between said tip baffle and said trailing edge, and disposed in cascade flow communication with said forward pocket over said tip baffle;

the turbine blade further comprising a plurality of said tip baffles spaced chordally apart between said leading and trailing edges and integrally joined to said first and second ribs to define corresponding tip pockets transversely bridging said first and second ribs; and the plurality of tip baffles further comprising only two of said tip baffles bridging said first and second ribs and partitioning said tip into three tip pockets.

16. A blade according to claim 15 wherein one of said tip baffles is disposed forward of said hump and the remaining tip baffle is disposed aft of said hump.

17. A blade according to claim 15 wherein both of said tip baffles are straight transversely between said first and second ribs.

18. A blade according to claim 15 wherein both of said tip baffles are serpentine transversely between said first and second ribs.

19. A blade according to claim 18 wherein both of said tip baffles are concave forward toward said leading edge at said first rib, and convex forward toward said leading edge at said second rib.

20. A turbine blade comprising an airfoil tip having a pressure-side first rib joined to a suction-side second rib at opposite leading and trailing edges and extending outwardly from a tip floor, and a cascade tip baffle bridging said first and second ribs in a one-piece metal casting above said tip floor forward of the maximum width of said tip to partition said tip chordally into corresponding tip pockets on opposite sides of said baffle;

the turbine blade further comprising an airfoil having a concave pressure side and an opposite convex suction side and increasing in transverse width there between from said leading edge to a hump at said maximum width, and decreasing in width to said opposite trailing edge, and said tip baffle integrally joins said first and second ribs aft of said leading edge and oblique thereto to define a forward tip pocket behind said leading edge and transversely distribute flow streamlines in a cascade aft thereover, wherein said forward pocket diverges in width aft therefrom;

the turbine blade further comprising an aft tip pocket converging in width between said tip baffle and said trailing edge, and disposed in cascade flow communication with said forward pocket over said tip baffle;

the turbine blade further comprising a plurality of said tip baffles spaced chordally apart between said leading and trailing edges and integrally joined to said first and second ribs to define corresponding tip pockets transversely bridging said first and second ribs; and the plurality of tip baffles further comprising only three of said tip baffles bridging said first and second ribs and partitioning said tip into four tip pockets.

21. A blade according to claim 20 wherein two of said tip baffles are disposed forward of said hump, and the remaining tip baffle is disposed aft of said hump.

22. A blade according to claim 20 wherein said three tip baffles are straight transversely between said first and second ribs.

23. A blade according to claim 20 wherein said airfoil is hollow and includes a cooling circuit having multiple channels separated by partitions, and said tip baffles are integral extensions of respective ones of said partitions.

* * * * *